United States Patent [19]

Maurer

[11] Patent Number: 5,250,645
[45] Date of Patent: Oct. 5, 1993

[54] POLYMERISABLE COMPOSITIONS AND USE OF THESE COMPOSITIONS FOR SEALING SUBTERRANEAN ENVIRONMENTS

[75] Inventor: Robert Maurer, Saint Cyr Au Mont d'Or, France

[73] Assignee: Rhone-Poulenc Chimie, Courbevoie, France

[21] Appl. No.: 879,136

[22] Filed: May 5, 1992

Related U.S. Application Data

[63] Continuation of Ser. No. 647,014, Jan. 29, 1991, abandoned.

[30] Foreign Application Priority Data

Jul. 30, 1990 [FR] France ................... 90 09922

[51] Int. Cl.$^5$ .............. C08F 18/00; C08F 20/26; C08F 20/68; C08F 22/10; C08F 118/00; C08F 120/26; C08F 120/68; C08F 122/10; C08F 218/00; C08F 220/26; C08F 220/68
[52] U.S. Cl. ................... 526/320; 524/558; 524/832; 526/229
[58] Field of Search ............ 524/558, 832; 526/229, 526/320

[56] References Cited

U.S. PATENT DOCUMENTS 3,375,872  4/1968  McLaughlin et al. .......... 166/29
3,928,052  12/1975  Clement, Jr. .................. 106/76
4,741,790  5/1988  Hawe et al. .................... 524/558

FOREIGN PATENT DOCUMENTS 1303456  1/1973  United Kingdom .

Primary Examiner—Paul R. Michl
Assistant Examiner—U. K. Rajguru
Attorney, Agent, or Firm—Finnegan, Henderson, Farabow, Garrett & Dunner

[57] ABSTRACT

The present invention relates to new polymerisable compositions based on at least one water-soluble or dispersible alkoxy alkyl ester of an unsaturated carboxylic acid.

More precisely, these compositions comprise:
at least one methoxypolyalkoxyethyl methacrylate or acrylate
at least one initiator chosen from alkali metal persulphates, ammonium persulphate and hydrogen peroxide,
at least one polymerisation accelerator, and water.

These compositions can be employed especially for sealing subterranean environments.

20 Claims, No Drawings

POLYMERISABLE COMPOSITIONS AND USE OF THESE COMPOSITIONS FOR SEALING SUBTERRANEAN ENVIRONMENTS

This application is a continuation of application Ser. No. 07/647,014 filed Jan. 29, 1991, now abandoned.

The present invention relates to new polymerisable compositions based on at least one water- o soluble or dispersible alkoxyalkyl ester of an unsaturated carboxylic acid.

These compositions can be employed especially for sealing subterranean environments.

Consolidation of soils and sealing of subterranean structures, such as underground railway tunnels, sewers, underground car parks, storage ponds, swimming pools, oil wells, mine shafts and dams, present problems.

Among the many solutions which have been proposed, cement grouts, silicate grouts and synthetic resin grouts may be mentioned.

Synthetic resins derived from unsaturated aliphatic acids, more specifically from acrylic acid and methacrylic acid, have been especially recommended.

Thus, Patent FR-A-1,113,937 describes the use of an acrylic acid derivative, such as acrylamide, N-alkylacrylamides, acrylonitrile, alkyl acrylates and metal acrylates, and of an alkylidenediacrylamide.

The major disadvantage of such compositions lies in the toxicity of certain of these compounds, more particularly of acrylamide, which is most frequently employed.

The ecological demands of nontoxicity of the products which may be in contact with water have led to the investigation of substitute compounds.

Thus, Patent GB-A-1,303,456 describes compositions containing a hydroxyalkyl acrylate or methacrylate which may be coupled with an alkylene glycol diacrylate or dimethacrylate, a soluble silver salt and a metal persulphate.

These compositions cannot contain high concentrations of monomers because the exothermicity caused by their polymerisation results in a high expansion and in the formation of foams, and this interferes with some applications, especially in the case of operations for plugging cracks in subterranean structures.

The present invention enables these various problems of nontoxicity and effectiveness to be solved.

More precisely, it consists of polymerisable aqueous compositions characterised in that they comprise:
at least one water-soluble or dispersible monomer of general formula (I):

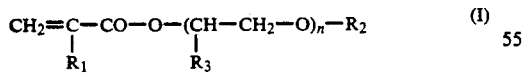

in which:
$R_1$ denotes a hydrogen atom or a methyl radical,
$R_2$ denotes a methyl or ethyl radical,
$R_3$ denotes a hydrogen atom or a methyl radical,
n denotes a number from 3 to 6,
at least one initiator chosen from alkali metal persulphates, ammonium persulphate and hydrogen peroxide,
at least one polymerisation accelerator and water.

Ammonium persulphate and sodium persulphate are the initiators most frequently employed.

The quantity of initiator is usually from 0.1% to 50% by weight relative to the weight of monomer of formula (I), and preferably from 0.5% to 20% by weight.

The polymerisation accelerator, also called an activator, is generally an amine.

Tertiary amines are preferred.

Primary or secondary amines or amine hydrochlorides can also be employed, but the polymerisation rate obtained with these accelerators is lower than with tertiary amines.

The amine polymerisation accelerator may include other chemical functional groups in its formula, such as, for example nitrile or hydroxyl or ester functional groups.

The ester functional groups may, in particular, originate from the esterification with acrylic acid or methacrylic acid of one or more hydroxyl functional groups present in the formula of the amine.

Among the preferred tertiary amines there may be mentioned diethylaminopropionitrile, triethanolamine, dimethylaminoacetonitrile, diethylenetriamine, N,N-dimethylaniline, dimethylaminoethyl methacrylate, dimethylaminoethyl acrylate, triethanolamine methacrylate and triethanolamine acrylate.

The accelerator usually represents from 0.1% to 100% by weight of the weight of monomer of formula (I), and preferably from 0.5% to 80%.

The monomer of formula (I) is preferably a methacrylate, that is to say that $R_1$ is a methyl radical.

In fact, although acrylates ($R_1=H$) are more reactive, methacrylates are preferably employed for sealing subterranean structures in order to meet the criterion of nontoxicity as much as possible.

The compounds of formula (I) in which the radical $R_3$ denotes a hydrogen atom, that is to say polyethoxyalkyl acrylates and preferably methacrylates, are generally preferred.

Among the compounds of formula (I) 2-(methoxytriethoxy)ethyl methacrylate (n=4) is most commonly employed, by itself or mixed with its lower or higher homologues (n=3, 5 or 6).

The aqueous compositions of the invention generally contain from 10% to 95% of monomer of formula (I), and preferably from 20% to 90%.

The monomer of formula (I) permits the use of highly concentrated compositions, because excessive heating is not observed. Nor is excessive expansion, which is awkward, observed when fissures are being plugged.

The monomers of formula (I) can be prepared by transesterification between a lower alkyl, in most cases methyl, ester of acrylic or methacrylic acid and at least one ether alcohol of formula (II):

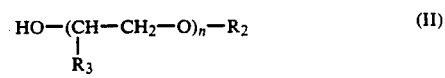

in which:
$R_2$ denotes a methyl or ethyl radical,
$R_3$ denotes a hydrogen atom or a methyl radical,
n denotes a whole or fractional number from 3 to 6
the transesterfication can be effected under conventional conditions and in the presence of known catalysts for this type of reaction, such as, for example, sodium, potassium or lithium alcoholates, sodium, potassium or lithium carbonates, butyl titanate or sodium, potassium or lithium hydroxides.

The ether alcohols of formula (II) are prepared by reaction of ethylene or propylene oxide with methanol or ethanol in a proportion of 3 to 6 molecules of ethylene or propylene oxide per molecule of methanol or ethanol, or are prepared by reaction of ethylene or propylene oxide with at least one alcohol ether of general formula (III):

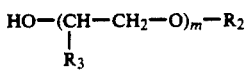

in which:
m denotes a number from 1 to 3,
$R_2$ denotes a methyl or ethyl radical,
$R_3$ denotes a hydrogen atom or a methyl radical, so as to increase the number of

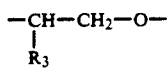

units from the value m to the desired value n.

The compositions of the invention frequently include a so-called crosslinking compound.

This is generally an ester containing at least 2 ethylenic double bonds, in order to be able to create bonds between two polymer chains when the monomers of formula (I) are being polymerised.

This crosslinker usually represents from 0.1 to 20% by weight relative to the weight of the monomer of formula (I), and preferably from 0.2% to 10% by weight per weight.

Among the crosslinkers which are generally employed there may be mentioned, for example, tetraethylene glycol dimethacrylate, a polyethylene glycol dimethacrylate and allyl methacrylate.

The compositions of the invention are used in a known manner which varies depending on the type of use.

They may contain the usual additives which make it possible especially to adjust their density and their viscosity to the desired values: densifying fillers of the barium sulphate type, various reinforcing or diluting fillers of the bentonite and silica type and thickening fillers of the xanthane gum type.

In practice the compositions of the invention are injected into the subterranean environments to be sealed.

In the case of the consolidation of soils such as alluvia the compositions can also be applied by impregnation.

Insofar as storage is concerned, two solutions are usually prepared, which are mixed only at the time of their use to form the compositions of the invention:

a first solution containing the monomer(s) of formula (I), if appropriate a crosslinker such as defined above and the polymerisation accelerator;

a second solution containing water, the initiator and possible other additives.

The examples which follow illustrate the invention.

EXAMPLE 1

Preparation of 2-(methoxytriethoxy)ethyl methacrylate

A) Preparation of 2-(methoxytriethoxy)ethanol

The following are charged into a 6-liter round bottom flask comprising a stirring system, a thermometer, a vertical condenser and means of heating:

triethylene glycol monomethyl ether (M=163.6):2454 g (15 mol)
ethylene oxide (M=44.05):662.6 g (15.04 mol)
KOH:4.4 g These are heated with stirring for 1 hour 10 minutes at a temperature of 150 to 165° C.

The product obtained has an OH value of 271.4.

It corresponds to the formula (II) for which $R_2=CH_3$, $R_3=H$ and n=4.

B) Preparation of 2-(methoxytriethoxy)ethyl methacrylate

The following are charged into a multinecked round bottom flask fitted with a stirrer, a thermometer, openings for introducing various reactants and catalysts, a dip tube and an azeotropic distillation column:

2-(methoxytriethoxy)ethanol prepared in A (M=206.7): 1137.1 g (5.5 mol)
methyl methacrylate (M=100.12): 633.3 g (6.3 mol)
hexane : 400 cm$^3$
Nonox inhibitor (N,N'-diphenyl-paraphenylenediamine): 1.51 g ($4.2 \times 10^{-3}$)
lithia : 1.8 g ($7.31 \times 10^{-2}$ mol)

The methanol which is formed in the reaction is removed over 5 h by azeotropic distillation with hexane.

The temperature changes from 105° C. at the beginning of reaction to 120° at the end of reaction.

1704.5 g of crude product are obtained.

This product is topped for 1 h at 110° C. at a pressure of 6600 Pa, which is reduced to 4000 Pa at the end of operation.

1485.3 g of 2-(methoxytriethoxy)ethyl methacrylate are obtained and are neutralised to pH 5 with the aid of sulphuric acid and then are decolorised and filtered.

The final product is a reddish clear liquid.

EXAMPLE 2

Preparation of 2-(methoxytetraethoxy)ethyl methacrylate

A) Preparation of 2-tetraethoxy)ethanol

The following are charged into the apparatus described in example 1 A):

triethylene glycol monomethyl ether (M=163.6): 2454 g (15 mol)
ethylene oxide (M=44.05): 1325 g (30 mol)
KOH: 4.4 g These are heated and stirred for 2 hours at a temperature of 150° to 165° C.

The product obtained has an OH value of 223.3.

It corresponds to the formula (II) for which $R_2=CH_3$, $R_3=H$ and n=5.

B) Preparation of 2-(methoxytetraethoxy)ethyl methacrylate

The following are charged into the apparatus employed in Example 1 B):

2-(methoxytetraethoxy)ethanol prepared in A (M=251.3): 1130.8 g (4.5 mol)
methyl methacrylate (M=100.12): 518 g (5.2 mol)
hexane: 400 cm$^3$
Nonox inhibitor: 1.44 g ($4 \times 10^{-3}$ mol)
lithia: 1.47 g ($6.03 \times 10^{-2}$ mol)

The methanol which is formed in the reaction is removed over 5 h by azeotropic distillation with hexane.

The temperature rises from 103° C. at the beginning of reaction to 120° at the end of reaction.

1729 g of crude product are obtained.

This product is topped for 1 h at 115° C. at pressure of 6600 Pa, which is reduced to 4000 Pa at the end of operation.

1422 g of 2-(methoxytetraethoxy)ethyl methacrylate are obtained and are neutralised to pH 3 with the aid of phosphoric acid and are then decolorised and filtered.

The final product is a dark greenish clear liquid.

EXAMPLE 3

Preparation of 2-(methoxypentaethoxy)ethyl methacrylate

A) Preparation of 2-(methoxypentaethoxy)ethanol

The following are charged into the apparatus described in example 1 A):

triethylene glycol monomethyl ether (M=163.6): 2454 g (15 mol)

ethylene oxide (M=44.05): 1987 g (45 mol)

KOH: 4.4 g

These are heated and stirred for 3 hours 20 minutes at a temperature of 150° to 165° C.

The product obtained has an OH value of 190.8.

It corresponds to the formula (II) for which $R_2=CH_3$, $R_3=H$ and $n=6$.

B) Preparation of 2-(methoxyoentaethoxy)ethyl methacrylate

The following are charged into the apparatus employed in Example 1 B):

2-(methoxypentaethoxy)ethanol prepared in A (M=294.1): 1029.3 g (3.5 mol)

methyl methacrylate (M=100.12): 403 g (4.02 mol)

hexane: 400 cm$^3$

Nonox inhibitor: 1.27 g ($3.52 \times 10^{-3}$ mol)

lithia: 1.15 g ($4.69 \times 10^{-2}$ mol)

The methanol which forms in the reaction is removed over 7 h by azeotropic distillation with hexane.

The temperature rises from 95° C. at the beginning of reaction to 120° at the end of reaction.

1465 g of crude product are obtained.

This product is topped for 1 h at 120° C. at a pressure of 10,000 Pa, which is reduced to 6600 Pa at the end of operation.

1465 g of 2-(methoxypentaethoxy)ethyl methacrylate are obtained and are neutralised to pH 4 with the aid of sulphuric acid and are then decolorised and filtered.

The final product is a dark reddish clear liquid.

EXAMPLE 4

First of all a solution A is prepared by mixing the following at room temperature:

100 g of 2-(methoxytriethoxy)ethyl methacrylate prepared in example 1, 0.5 g of tetraethylene glycol dimethacrylate (crosslinker)

From this solution various aqueous compositions A1, A2, A3, A4 and A5, containing different concentrations of monomer are prepared.

Table I below shows the nature of the constituents of these compositions, their respective quantities in grams, and:

the time needed for their polymerisation (setting time)

the maximum temperature (T° max) reached during the polymerisation.

TABLE I

| Compositions | Solution A | Triethanolamine | Water | Na persulphate | Setting time | T° max |
|---|---|---|---|---|---|---|
| A1 | 20 | 1.5 | 30 | 1.5 | 5 min | 50° C. |
| A2 | 25 | 1.5 | 25 | 1.5 | 4 min | 55° C. |
| A3 | 30 | 1.5 | 20 | 1.5 | 3 min 40 s | 59° C. |
| A4 | 40 | 1.5 | 10 | 1.5 | 3 min 55 s | 68° C. |
| A5 | 45 | 1.5 | 5 | 1.5 | 4 min 15 s | 67° C. |

The different compositions A1, A2, A3, A4 and A5 are used to obtain gels which are free from supernatant liquid.

Compositions A'1, A'2, A'3, A'4 and A'5 which correspond to the compositions A1, A2, A3, A4 and A5, but in which 2-(methoxytriethoxy)ethyl methacrylate is replaced with the same quantity of 2-hydroxyethyl methacrylate, show the following maximum temperatures when polymerised:

A'1 : 68° C.
A'2 : 83° C.
A'3 : 92° C.
A'4 : >100° C. (violent reaction with strong sputtering)
A'5 :> 100° C. (violent reaction with strong sputtering)

EXAMPLE 5

First of all a solution B is prepared by mixing the following at ambient temperature:

100 g of 2-(methoxytriethoxy)ethyl methacrylate prepared in example 1, 1 g of allyl methacrylate (crosslinker)

From this solution various aqueous compositions B1, B2, B3, B4 and B5 are prepared, containing different concentrations of monomer.

Table II shows the nature of the constituents of these compositions, their respective quantities in grams, and:

the time needed for their polymerisation (setting time)

the maximum temperature (T° max) reached during the polymerisation.

TABLE II

| Compositions | Solution B | Triethanolamine | Water | Na persulphate | Setting time | T° max |
|---|---|---|---|---|---|---|
| B1 | 20 | 1.5 | 30 | 1.5 | 6 min 7 s | 43° C. |
| B2 | 25 | 1.5 | 25 | 1.5 | 4 min 50 s | 49° C. |
| B3 | 30 | 1.5 | 20 | 1.5 | 4 min 30 s | 55° C. |
| B4 | 40 | 1.5 | 10 | 1.5 | 5 min 14 s | 64° C. |
| B5 | 45 | 1.5 | 5 | 1.5 | 7 min 17 s | 63° C. |

The various compositions B1, B2, B3, B4 and B5 are used to obtain gels which are free from supernatant liquid.

Compositions B'1, B'2, B'3'B'4 and B'5 which correspond to the compositions B1, B2, B3, B4 and B5, but in which 2-(methoxytriethoxy)ethyl methacrylate is replaced with the same quantity of 2-hydroxyethyl methacrylate, show the following maximum temperatures when polymerised:

B'1 : 72° C.
B'2 : 76° C.
B'3 : 92° C. (reaction with sputtering)
B'4 : >100° C. (violent reaction with strong sputtering, great expansion and yellowing)
B'5 : >100° C. (violent reaction with sputtering, great expansion, yellowing and overflowing)

EXAMPLE 6

First of all a solution C is prepared by mixing the following at room temperature:
100 g of 2-(methoxydiethoxy)ethyl methacrylate
1 g of allyl methacrylate (crosslinker)

From this solution various aqueous compositions C1, C2, C3, C4 and C5 are prepared, containing different concentrations of monomer.

Table III below shows the nature of the constituents of these compositions, their respective quantities in grams, and:
the time needed for their polymerisation (setting time)
the maximum temperature (T° max) reached during the polymerisation.

TABLE III

| Com-positions | Solution C | Tri-ethanol-amine | Water | Na per-sulphate | Setting time | T° max |
|---|---|---|---|---|---|---|
| C1 | 20 | 1.5 | 30 | 1.5 | 6 min 30 s | 50° C. |
| C2 | 25 | 1.5 | 25 | 1.5 | 6 min | 51° C. |
| C3 | 30 | 1.5 | 20 | 1.5 | 8 min | 50° C. |
| C4 | 40 | 1.5 | 10 | 1.5 | 6 min | 56° C. |
| C5 | 45 | 1.5 | 5 | 1.5 | 5 min | 72° C. |

The various compositions C4 and C5 are used to obtain gels which are free from supernatant liquid.

With compositions C1, C2 and C3 gels are obtained which contain supernatant liquid in a quantity which decreases from C1 to C3.

EXAMPLE 7

First of all a solution D is prepared by mixing the following at room temperature:
94 g of 2-(methoxytriethoxy)ethyl methacrylate
6 g of polyethylene glycol dimethacrylate (crosslinker) (of molecular mass 400)

From this solution various aqueous compositions D1, D2, D3, D4, D5, D6 and D7 are prepared, containing different concentrations of monomer.

Table IV below shows the nature of constituents of these compositions, their respective quantities in grams, and:
the time needed for their polymerisation (setting time)
the maximum temperature (T° max) reached during the polymerisation.

TABLE IV

| Com-positions | Solution D | DMAEMA* | Water | Na per-sul-phate | Setting time | T° max |
|---|---|---|---|---|---|---|
| D1 | 40 | 10 | 50 | 3 | 50 s | 61° C. |
| D2 | 30 | 10 | 60 | 3 | 56 s | 56° C. |
| D3 | 20 | 10 | 70 | 3 | 1 min 12 s | 51° C. |
| D4 | 20 | 5 | 75 | 3 | 1 min 22 s | 43° C. |
| D5 | 20 | 10 | 70 | 5 | 1 min | 54° C. |
| D6 | 15 | 5 | 80 | 5 | 1 min 58 s | 43° C. |
| D7 | 40 | 10 | 50 | 5 | 48 s | 63° C. |

*DMAEMA = dimethylaminoethyl methacrylate

The different compositions D1 and D7 are used to obtain gels which are free from supernatant liquid.

With compositions D1, D2 and D7 opaque gels are obtained, while with compositions D3, D4 and D5 translucent gels which transmit vibrations are obtained.

The various gels obtained from compositions D1 to D7 are beige in colour.

The claimed invention is:

1. A polymerisable aqueous composition comprising:
at least one water-soluble or dispersible monomer of formula (I):

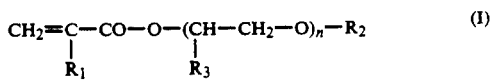

wherein:
$R_1$ denotes a hydrogen atom or a methyl radical,
$R_2$ denotes a methyl or ethyl radical,
$R_3$ denotes a hydrogen atom or a methyl radical,
n is an integer from 3 to 6,
at least one initiator selected from alkali metal persulphates, ammonium persulphate and hydrogen peroxide,
at least one polymerisation accelerator, and
water.

2. The composition according to claim 1, wherein said initiator is ammonium persulphate or sodium persulphate.

3. The composition according to claim 2, wherein the ratio of initiator is from 0.1% to 50% by weight relative to the weight of monomer of formula (I).

4. The composition according to claim 3, wherein said ratio of initiator to monomer of formula (I) is 0.5% to 20% by weight.

5. The composition according to claim 1, wherein said polymerization accelerator is an amine.

6. The composition according to claim 5, wherein said polymerization accelerator is an amine.

7. The composition according to claim 6, wherein said polymerization accelerator is a tertiary amine selected from diethylaminopropionitrile, triethanolamine, dimethylaminoacetonitrile, diethylenetriamine, N,N-dimethylaniline, dimethylaminoethyl methacrylate, dimethylaminoethyl acrylate, triethanolamine methacrylate and triethanolamine acrylate.

8. The composition according to claim 7, wherein said polymerization accelerator is present in an amount from 0.1% to 100% by weight of the weight of monomer of formula (I).

9. The composition according to claim 8, wherein said amount is 0.5% to 80%.

10. The composition according to claim 1, wherein $R_1$ is methyl.

11. The composition according to claim 7, wherein $R_1$ is methyl.

12. The composition according to claim 11, wherein said monomer of formula (I) is a monomer wherein $R_1$ is methyl, $R_2$ is ethyl, $R_3$ is hydrogen, and $R_4$ or a mixture of monomers wherein $R_1$ is methyl, $R_2$ is ethyl, $R_3$ is hydrogen and n is 3, 4, 5 or 6.

13. The composition according to claim 1, comprising from 10% to 95% of said monomer of formula (I).

14. The composition according to claim 11, comprising from 10% to 95% of said monomer of formula (I).

15. The composition according to claim 14, comprising from 20% to 90% of said monomer of formula (I).

16. The composition according to claim 1, further comprising a crosslinking compound selected from esters containing at least two ethylenic bonds.

17. The composition according to claim 16, wherein said crosslinking compound is tetraethylene glycol dimethyacrylate, a polyethylene glycol dimethacrylate or allyl methacrylate.

18. The composition according to claim 14, further comprising a crosslinking compound selected from tetraethylene glycol dimethacrylate, a polyethylene glycol dimethacrylate, and allyl methacrylate.

19. The composition according to claim 17, wherein said crosslinking compound is present in an amount from 0.1% to 20% by weight relative to the weight of the monomer of formula (I).

20. The composition according to claim 18, wherein said crosslinking compound is present in an amount from 0.2% to 10% by weight relative to the weight of the monomer of formula (I).

* * * * *

UNITED STATES PATENT AND TRADEMARK OFFICE
CERTIFICATE OF CORRECTION

PATENT NO. : 5,250,645
DATED : October 05, 1993
INVENTOR(S) : Robert Maurer

It is certified that error appears in the above-indentified patent and that said Letters Patent is hereby corrected as shown below:

Claim 1, column 8, line 13, change "denotes" to --is--.

Claim 1, column 8, line 14, change "denotes" to --is--.

Claim 1, column 8, line 15, change "denotes" to --is--.

Signed and Sealed this

Sixteenth Day of August, 1994

Attest:

BRUCE LEHMAN

*Attesting Officer*   *Commissioner of Patents and Trademarks*